(12) United States Patent
Jochheim

(10) Patent No.: US 9,571,612 B2
(45) Date of Patent: Feb. 14, 2017

(54) WRIST PHONE WITH IMPROVED VOICE QUALITY

(75) Inventor: Edgar Jochheim, Munich (DE)

(73) Assignee: venyard GmbH, Munich (DE)

( * ) Notice: Subject to any disclaimer, the term of this patent is extended or adjusted under 35 U.S.C. 154(b) by 1071 days.

(21) Appl. No.: 12/927,355

(22) Filed: Nov. 12, 2010

(65) Prior Publication Data

US 2012/0122519 A1    May 17, 2012

(51) Int. Cl.
| | |
|---|---|
| B23P 11/00 | (2006.01) |
| H04M 1/00 | (2006.01) |
| H04M 1/02 | (2006.01) |
| H04B 1/3827 | (2015.01) |

(52) U.S. Cl.
CPC .......... H04M 1/0202 (2013.01); H04B 1/385 (2013.01); Y10T 29/49826 (2015.01)

(58) Field of Classification Search
CPC . H04B 1/385; H04M 1/0202; Y10T 29/49826
USPC .................................... 455/556.1; 379/433.1
See application file for complete search history.

(56) References Cited

U.S. PATENT DOCUMENTS

| | | | | |
|---|---|---|---|---|
| 5,134,418 | A | 7/1992 | Gomez et al. ................ 343/718 |
| 5,986,566 | A | 11/1999 | Yamamori ............... 340/825.44 |
| 6,035,217 | A | 3/2000 | Kravitz .......................... 455/561 |
| 6,281,854 | B1 * | 8/2001 | Ohoka ................... H01Q 1/273 |
| | | | | 343/718 |
| 6,590,835 | B2 * | 7/2003 | Farine et al. .................... 368/10 |
| 6,850,773 | B1 | 2/2005 | Ghassabian ................... 455/550 |
| 7,038,634 | B2 | 5/2006 | Bisig ............................. 343/866 |
| 7,151,496 | B2 | 12/2006 | Casagrande et al. ......... 343/718 |
| 7,439,935 | B1 | 10/2008 | Rodenbeck .................... 343/895 |
| 7,463,205 | B2 | 12/2008 | Turner et al. ................. 343/718 |
| 7,551,142 | B1 | 6/2009 | Zhang et al. ................. 343/702 |
| 2003/0194084 | A1 * | 10/2003 | Gilmour ............... H04B 1/385 |
| | | | | 379/433.1 |
| 2004/0082370 | A1 | 4/2004 | Gahl et al. ................. 455/575.5 |
| 2007/0040153 | A1 * | 2/2007 | Jung et al. ..................... 252/500 |
| 2007/0279852 | A1 * | 12/2007 | Daniel ................. A44C 5/0007 |
| | | | | 361/679.03 |
| 2011/0241943 | A1 * | 10/2011 | Shiu et al. ............. 343/700 MS |
| 2011/0255850 | A1 * | 10/2011 | Dinh et al. .................... 396/176 |

* cited by examiner

*Primary Examiner* — Qun Shen
(74) *Attorney, Agent, or Firm* — Imperium Patent Works; Darien K. Wallace

(57) ABSTRACT

A wrist phone with a single button includes a molded-plastic wristband and a wristband cap. A wireless transceiver module is mounted on a printed circuit board and is contained in a component cavity between the wristband and the wristband cap. A foil antenna is attached directly to the printed circuit board and extends between an outer layer and a wrist-facing layer of a flexible strap portion of the wristband. A microphone is located between the layers of the opposite flexible strap portion of the wristband at least two centimeters away from the wireless transceiver module. The single button is formed using the interleaved fingers of a landing pad on a surface beneath the inner surface of the wristband. The inner surface of the wristband is covered by a layer of conductive material that makes an electrical connection between the interleaved fingers when the outer surface of the wristband is pressed.

16 Claims, 7 Drawing Sheets

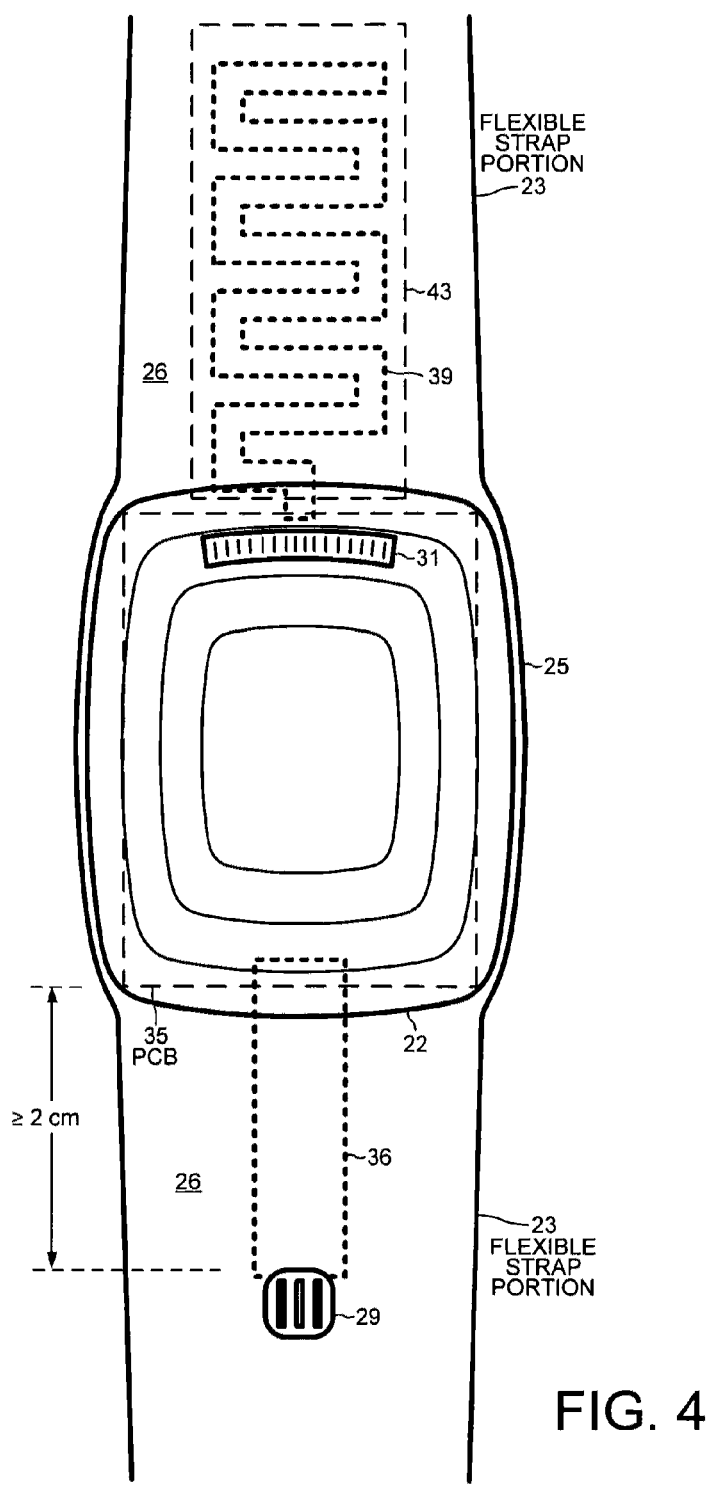
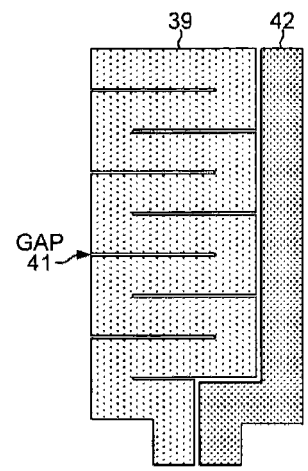
FIG. 5
FIG. 4

WRIST PHONE WITH IMPROVED VOICE QUALITY

TECHNICAL FIELD

The present invention relates to portable communication devices, and in particular to a one-button wrist phone without a display that has superior voice quality.

BACKGROUND INFORMATION

A portable communication device such as a cell phone communicates voice signals over a radio frequency channel via an antenna. The portable communication device incorporates a microphone and a speaker that are used for the voice communication. The portable communication device typically has a housing that includes the microphone and speaker, a display, a key pad, an antenna, and various analog, digital and radio frequency (RF) circuitry that facilitate the reception and transmission of the voice signals over an RF channel. The microphone converts the voice signal into a corresponding electrical signal that is processed by the device circuitry and then modulated for generating a communication signal for transmission via the antenna. The antenna also receives a voice modulated signal that is demodulated in the receiver to produce a voice signal that is applied to the speaker to make the voice signal audible.

The speaker and the microphone are typically disposed in the same housing on opposite ends of the portable communication device. For example, a cell phone is typically held with the speaker being near the user's ear while the user speaks into the microphone. With the miniaturization of electronics, it has now become possible to fit the components of a portable communication device onto a wristband to make a wrist phone. While a wrist phone is more convenient because it is smaller and weighs less, the smaller size can also in some ways be less convenient.

FIG. 1 (prior art) shows a wrist phone 10 attached to a wrist band 11 in which the keypad is implemented on a touch-screen display 12. The space saved by eliminating a physical keypad can be used to enlarge the display 12. Despite the larger virtual keypad, however, the numbers on the keypad are so small that the tip of the user's index finger is larger than a single key. The keys are best pressed using a stylus or the tip of a pen. It is inconvenient for the user to carry the stylus or a pen just to use the touch-screen display 12. In addition, the display is still so small that elderly people have difficulty reading the displayed characters. Moreover, the speaker of the wrist phone cannot be held near the user's ear while the user speaks into the microphone because the length of the wrist phone is typically much shorter than the distance from the user's ear to the user's mouth. Thus, a loudspeaker function is used so that the user can speak into the wrist phone as though the user were reading the time from a wrist watch. The speech quality generated by such a wrist phone is understandably poor as the voice signal output from the loudspeaker enters the microphone disposed in the same small housing. The person talking to the user of the wrist phone hears an echo of that person's own voice.

A method is sought for making a wrist phone that has superior voice quality and for which the user does not have difficulty seeing the display or pressing individual keys of a keypad.

SUMMARY

A one-button wrist phone includes a wristband, a wristband cap, a wireless transceiver module, an antenna and a microphone. The wristband and the wristband cap are made of molded plastic. The wireless transceiver module is mounted on a printed circuit board and is contained in a component cavity between the wristband and the wristband cap. The antenna is a flat metallic foil with a meander form that is attached directly to the printed circuit board. The antenna extends out through a flexible strap portion of the wristband between an outer layer and a wrist-facing layer of the strap. A microphone is located between the layers of the opposite flexible strap portion of the wristband at least two centimeters away from the wireless transceiver module. A loudspeaker is located in the component cavity opposite the flexible strap portion that contains the microphone. The location of the microphone limits the amount of sound coming from the loudspeaker that is picked up by the microphone and thereby avoids creating an echo.

In one embodiment, the single button is formed using interleaved fingers of a landing pad on the surface of the battery beneath the inner surface of the wristband. The inner surface of the wristband is covered by a layer of conductive material that makes an electrical connection between the interleaved fingers when the outer surface of the wristband is pressed. In another embodiment, the one-button phone uses a click-type button made of a bent piece of metal. In yet another embodiment, the one-button phone uses a five-push input cursor in which landing pads are traced onto the top surface of the battery or the module at the four compass directions and in the middle.

Instead of using an antenna with a meander form inside the flexible strap portions of the wristband, a patch antenna can be placed under the button. The landing pads for the button fit in the open sections of the patch form of the antenna. The reception of the patch antenna is not degraded by the layer of molded plastic that forms the button.

A method of manufacturing a one-button wrist phone includes the steps of forming the wristband and the wristband cap from molded plastic. An inner surface of the wristband or wristband cap beneath the button is then coated with a layer of conductive material. A foil antenna is placed between the outer layer and the wrist-facing layer of one flexible strap portion of the wristband. A microphone is placed in the other flexible strap portion of the wristband at least two centimeters away from the wireless transceiver module. The antenna and the microphone are attached to the printed circuit board. The printed circuit board, together with the wireless transceiver module and the other electronic components, is then inserted into the component cavity. The wristband cap is attached to the wristband so as to enclose the component cavity. The openings for the microphone and loudspeaker are covered with a water-impermeable membrane so as to render the one-button wrist phone water resistant.

Further details and embodiments are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 is a top-down view showing a foil antenna in a flexible strap portion of the wrist phone of FIG. 2.

FIG. 5 shows a meander pattern of a flat antenna that fits between the layers of the flexible strap portion of the wrist phone of FIG. 2.

DETAILED DESCRIPTION

Figure 2:
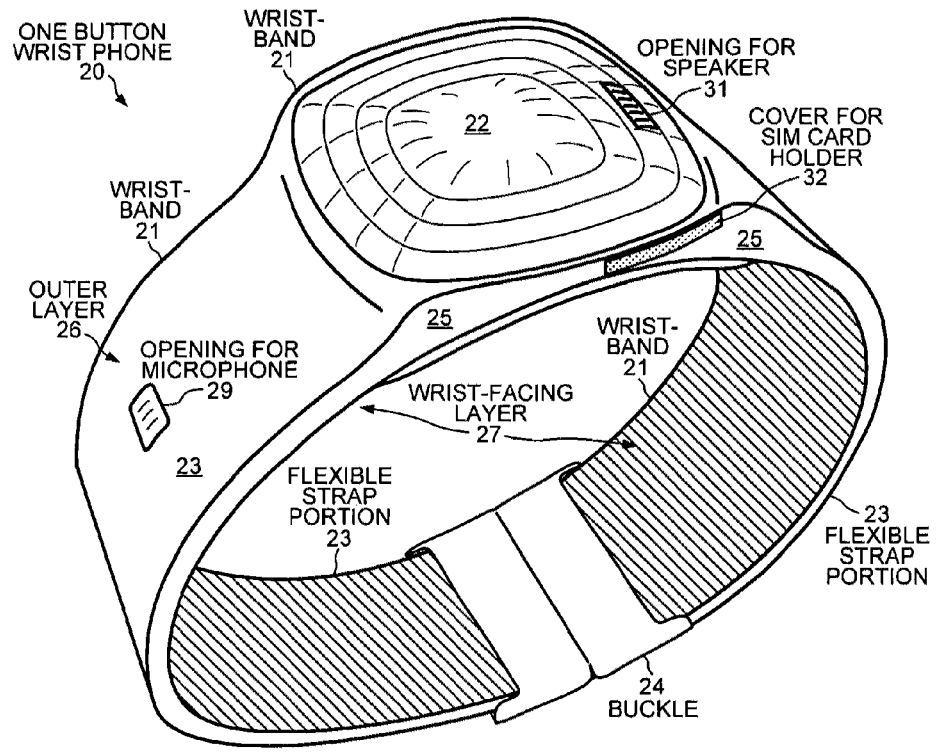
FIG. 2 is a perspective view of a one-button wrist phone with a microphone in the wristband.

FIG. 2 is a perspective view of a one-button wrist phone 20 with improved voice quality. Wrist phone 20 has a wristband 21 made of molded plastic and a wristband cap 22. Wristband 21 has two flexible, strap portions 23 that bend around a user's wrist and attach to each other at a buckle 24. Flexible strap portions 23 are more flexible than the center portion 25 of wristband 21 because flexible strap portions 23 are thinner. Each flexible strap portion 23 has an outer layer 26 and a wrist-facing layer 27. A microphone 28 is disposed between outer layer 26 and wrist-facing layer 27. Microphone 28 is disposed on flexible strap portion 23 at a location that is in line with the user's thumb when wrist phone 20 is worn. For a wrist phone sized for an average adult user, microphone 28 is located on flexible strap portion 23 at least two centimeters away from wristband cap 22. FIG. 2 shows an opening 29 in outer layer 26 above microphone 28 that permits the user's voice to be picked up by the microphone. In one embodiment, opening 29 is covered by a water-impermeable membrane such as Gore-Tex® fabric.

Center portion 25 of wristband 21 has a component cavity 40 (see FIG. 5) that contains the various components of wrist phone 20. For example, a wireless transceiver module is contained in component cavity 40 between wristband 21 and wristband cap 22. In one embodiment, wristband cap 22 is made of the same material as wristband 21. Wristband cap 22 snaps into wristband 21 so as to enclose component cavity 40. In one embodiment, a loudspeaker 30 is contained in component cavity 40. The sound from loudspeaker 30 exits component cavity 40 through an opening 31 in wristband cap 22. Opening 31 is located on the opposite side of wristband cap 22 from the flexible strap portion 23 that contains the microphone. Opening 31 is far enough away and is oriented in such a manner that the sounds emanating from opening 31 are not picked up by the microphone. Opening 31 is also covered by a membrane that is impermeable to water. FIG. 2 also shows a cover 32 for a SIM card holder contained in component cavity 40.

Figure 3:
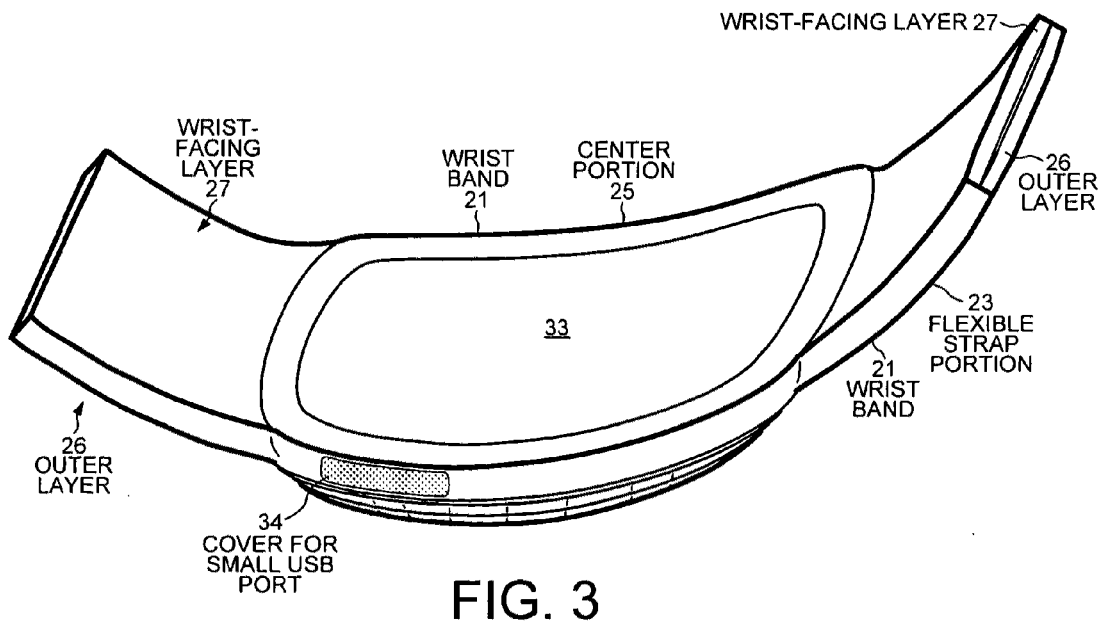
FIG. 3 is a perspective view of a portion of the wrist phone of FIG. 2 showing the wrist-facing surface of the center portion.

FIG. 3 is a perspective view of a portion of wrist phone 20 showing wrist-facing layer 27 and a wrist-facing surface 33 of center portion 25. FIG. 3 shows a cover 34 for a small USB port located on the opposite rim of center portion 25 from cover 32 for the SIM card holder.

FIG. 4 is a top-down view of a portion of wrist phone 20 in which the two flexible strap portions 23 are unclasped and extended. The strap portions taper so that they are somewhat narrower at the buckle ends (not shown in FIG. 4). The location of a printed circuit board (PCB) 35 in component cavity 40 beneath the wristband cap 22 is indicated in FIG. 4 by a dashed line. The wireless transceiver module and the other components of wrist phone 20 are attached to PCB 35. Microphone 28 is electrically coupled to the wireless transceiver module via foil conductors. FIG. 4 shows a dotted outline of an upper foil conductor 36 directly beneath outer layer 26. Both upper foil conductor 36 and a lower foil conductor 37 are disposed between outer layer 26 and wrist-facing layer 27.

In one embodiment, wristband 21 is a single piece of molded plastic in which flat channels extend from component cavity 40 into the strap portions 23 between outer layer 26 and wrist-facing layer 27. Wristband 21 is molded from thermoplastic elastomer (TPE) plastic. Before PCB 35 and the components are added to component cavity 40, upper and lower foil conductors 36-37 are inserted into the flat channel of one of the strap portions 23. The foil conductors 36-37 are separated by an insulating material 38 before being inserted into the strap portion 23. The ends of conductor 36-37 are then attached to the leads of microphone 28 and to pads on PCB 35. In FIG. 4, microphone 28 lies beneath opening 29, and the wireless transceiver module is disposed within the lateral boundaries of PCB 35. Thus, FIG. 4 shows that microphone 28 is located on flexible strap portion 23 at least two centimeters away from the wireless transceiver module.

FIG. 4 also shows a foil antenna 39 that is integrated into wristband 21. Foil antenna 39 is disposed between outer layer 26 and wrist-facing layer 27. Foil antenna 39 is made of a conductive sheet, such as copper foil. By placing the antenna in strap portion 23, antenna 39 can be made as long as one quarter of the operating wavelength of a wireless transceiver module operating at the frequencies of most cellular telephone standards. For example, a wireless transceiver module that operates at the GSM-850 band of the GSM standard in North America receives and transmits signals at 824-849 MHz. One quarter of the wavelength of a signal at 824 MHz is about 9.1 cm, which is much longer than the longest dimension of any housing that would fit on a wristband of an average adult. Superior reception can be achieved, however, by maintaining a ¼-lamda (monopole) antenna length and not being forced to accept an antenna that receives an even smaller portion of the signal wavelength. But even strap portion 23 is too short to accommodate a linear antenna that is 9.1 cm long. Fortunately, most of the other frequency bands used by cellular telephone operators in North America are at higher frequencies than 824 MHz, and therefore a ¼-lamda antenna length for those frequency bands is shorter than 9.1 cm.

In order to fit a 9.1-cm long antenna into strap portion 23, the antenna is given a slight meander or serpentine pattern. In FIG. 4, the center line of the flat serpentine band of antenna 39 is about 9.1 cm long. Because of the serpentine pattern, the length of the overall rectangular outline of the serpentine pattern is about half of the length of the center line. In operation, the flat foil band of antenna 39 wraps around the user's arm within flexible strap portion 23. The meander pattern of the flat foil provides a larger surface for receiving RF signals than does a wire antenna whose length is the same as the length of the center line of the flat meander pattern. Signals received on the larger surface of antenna 39 require less amplification, which extends battery life. The metal foil antenna provides better reception than does a wire antenna with the same mass of metal. In addition, a wire antenna in strap portion 23 is more likely to break due to metal fatigue as the wire bends with each wearing. The foil antenna is thinner in the bending dimension around the wrist and is less likely to break with wearing as the user repeatedly straps on wristband 21.

In one embodiment, antenna 39 is a metal foil, such as aluminum or copper. The copper or aluminum foil can also be coated with tin, lead, nickel, silver or gold. In another embodiment, antenna 39 is a thin metal sheet laminated to a flexible dielectric, such as a polyamide (Kapton) or a polyester (Mylar). For example, copper foil with a thickness of 0.0012 inches is laminated to a flexible mylar sheet having a thickness of 0.004 inches. In yet another embodiment, the pattern of the antenna is printed or silk screened onto a mylar flex backing. The metal foil or mylar sheet is inserted using a blade-shaped instrument into the flat channel between outer layer 26 and wrist-facing layer 27 of one of the strap portions 23.

In yet another embodiment, wristband 21 is made as two separate pieces of molded plastic that are later joined by ultrasonic welding after antenna 39 and conductors 36-37 have been "hot stamped" onto the inside surfaces of outer layer 26 and wrist-facing layer 27. A metal foil is pressed with a die having the meander form of antenna 39 to the inside surface of outer layer 26. The die is heated during the pressing of the planar antenna so that the plastic at the inside surface of outer layer 26 melts beneath the antenna and anneals the antenna to outer layer 26. After curing, the foil that extends beyond the antenna zone is removed in a cutting step. The thin foil that is not annealed to the plastic is brittle and can be removed from the area outside the antenna zone with little mechanical effort. By using hot stamping, the thickness of the copper foil can be reduced to about 0.006 inches.

Antenna 39 attaches directly to PCB 35, and there are no connectors or conductors between antenna 39 and PCB 35. A double foil layer or a thicker foil layer is used at the end of antenna 39 that attaches to a strip pad on one side of PCB 35. The thicker portion of antenna 39 must span the small gap between the surface of outer layer 26 and the edge of PCB 35. The plastic of wristband 21 becomes thicker at center portion 25 and prevents the foil of antenna 39 from bending at the location where the thicker foil spans the gap from PCB 35 to where the foil is annealed to the plastic of outer layer 26. The impedance along antenna 39 can remain relatively constant because there is a single piece of plastic beneath the entire surface area of antenna 39. In addition, the planar form of antenna 39 adds capacitance to the antenna and reduces the amount of impedance matching required to match the impedance of the antenna to the impedance of the antenna conductors along PCB 35 and within wireless module 44. Because of the single piece of plastic, signals traveling from the antenna to wireless module 44 need not traverse the rotating hinge shaft at the junction between a conventional arm band and the central casing that would typically contain a watch.

FIG. 5 shows the meander pattern of antenna 39 that has been annealed to outer layer 26 in a hot-stamping process. The foil in the narrow gap 41 between adjacent portions of the meandering path of antenna 39 is brittle after hot stamping and is easily removed by rubbing. The more compact form of the meander pattern of FIG. 5 wastes less of the foil that must be removed from areas outside the antenna zone. In addition, the longest dimension of the meander pattern in FIG. 5 is shorter than the longest dimension of the meander pattern in FIG. 4. FIG. 5 also shows a second antenna 42 whose center length is shorter than the length of the center line of antenna 39. Second antenna 42 is used to transmit and receive signals at higher frequencies than those of the GSM-850 frequency band, for example at the frequency bands around 1900 MHz. Thus, the two antennas 39 and 42 permit dual-band operation of wrist phone 20. Both antenna 39 and second antenna 42 are made in the same hot-stamping process steps.

Hot stamping can also be used to attach conductor 36 to the inside surface of outer layer 26, and conductor 37 to the inside surface of wrist-facing layer 27. A shield layer 43 is hot stamped to the inside surface of wrist-facing layer 27 opposite antenna 39. Insulating material 38 is then placed over conductor 37 and shield layer 43 before outer layer 26 is joined by ultrasonic welding to wrist-facing layer 27 of wristband 21.

Adding shield layer 43 between antenna 39 and the user's arm reduces the exposure of the user of wrist phone 20 to radio frequency (RF) energy emitted by antenna 39. The Federal Communications Commission (FCC) limit for public exposure from mobile phones is a specific absorption rate (SAR) level of 1.6 watts per kilogram of the body's tissue exposed to the RF energy. The SAR level is usually measured over a volume containing a mass of one gram of tissue. Because wrist phone 20 is a speaker phone and is not held touching the user's ear, the SAR level for the user's head is low. However, antenna 39 is strapped to the user's wrist and would expose the user's wrist to a high SAR level if shield layer 43 were not placed between antenna 39 and the user's wrist. FIG. 4 shows that the outline of shield layer 43 is larger than the dimensions of the meander pattern of antenna 39 so that the RF signal emitted from antenna 39 is blocked from penetrating the user's wrist.

Figure 6:
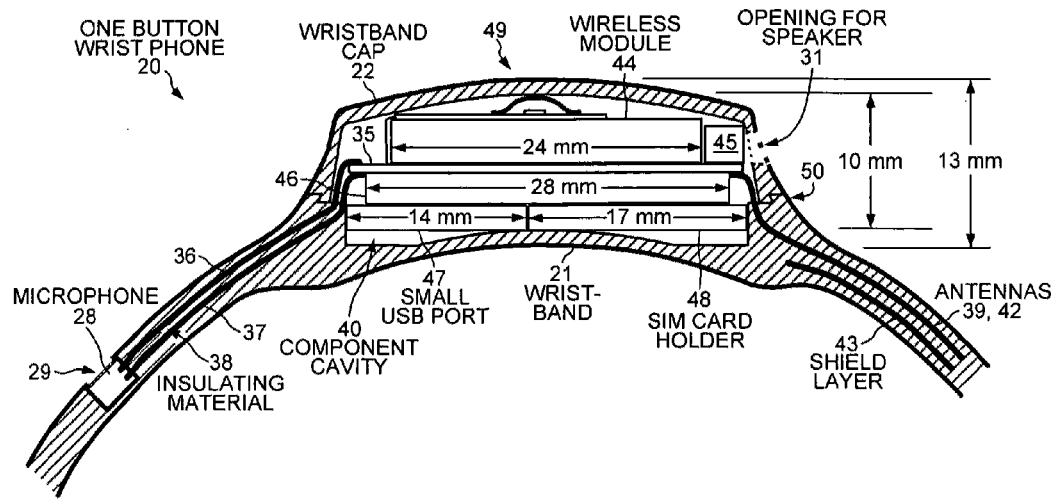
FIG. 6 is a cut-away side view of the wrist phone showing various electronic components contained in a component cavity between the wristband and the wristband cap.

FIG. 6 is a cut-away side view of one-button wrist phone 20. FIG. 6 shows the various components of wrist phone 20 contained in component cavity 40 between wristband 21 and wristband cap 22. A wireless transceiver module 44 is mounted to the top side of PCB 35. In one embodiment, module 44 is a SIM900 module manufactured by Shanghai SIMCom Wireless Solutions Ltd. The SIM900 module is 24 mm by 24 mm by 3 mm and is mounted in a flip-chip manner to PCB 35. The SIM900 module is a quad-band module and can operate in the 840, 900, 1800 and 1900 MHz bands. One end of antenna 39 is attached to a strip pad on PCB 35. Antenna 39 is then coupled through a trace on PCB 35 to a pin on the SIM900 module that acts as the RF antenna pad. The impedance of the antenna trace is controlled to fifty Ohms. The layout of the components in component cavity 40 reduces the distance that antenna 39 travels from PCB 35 to the plastic of strap portion 23. The vast majority of antenna 39 is enveloped in the plastic of strap portion 23. Antenna 39 is easier to tune than if it traveled through multiple types of materials with different dielectric constants.

One end of upper foil conductor 36 is attached to a strip pad on the upper surface of PCB 35, while an end of lower foil conductor 37 is attached to another strip pad on the bottom surface of PCB 35. The other ends of conductors 36-37 are connected to microphone 28. The loudspeaker 45 sits on PCB 35 next to module 44. Loudspeaker 45 is directly opposite opening 31 in wristband cap 22. A 3.7-volt lithium-ion cell battery 46 is attached to PCB 35 on the side opposite wireless transceiver module 44. A small USB port 47 and a subscription identification module (SIM) card holder 48 are disposed in component cavity 40 below battery 46.

A single button 49 is formed on top of module 44. FIG. 6 shows a click-type button made of a bent piece of metal. The metal makes electrical contact with a landing pad underneath where the top of wristband cap 22 is pressed. Another embodiment of button 49, however, does not include a bent piece of metal. Button 49 is made of the same molded plastic as is wristband 21. The inside surface of wristband cap 22 is covered by a conductive coating. An interleaved-finger landing pad is made with silver traces on the top of module 44. For example, the landing pad can be formed using silk screening. When the wristband cap 22 is depressed, the conductive coating on the inside surface of wristband cap 22 makes an electrical connection between the fingers of both sides of the landing pad. Thus, the entire upper surface of module 44 serves as a touch zone to activate single button 49, and the single button is part of wristband cap 22.

After the components are placed in component cavity 40 and the antenna and conductors are attached to PCB 35, wristband cap 22 is snapped down into wristband 21. Wristband cap 22 has a lip with a slightly larger diameter than the diameter of the ridge 50 of wristband 21 into which wristband cap 22 is pressed. All of the components inside component cavity 40 are electrically isolated from electromagnetic fields (EMF). Except for the small opening 31 for the speaker, which is covered by a water-impermeable fabric, the entire cavity 40 is surrounded by TPE plastic, which is an insulator. Because the electronic components are completely isolated, damage from electrostatic discharge (ESD) is much less likely.

Figure 7:
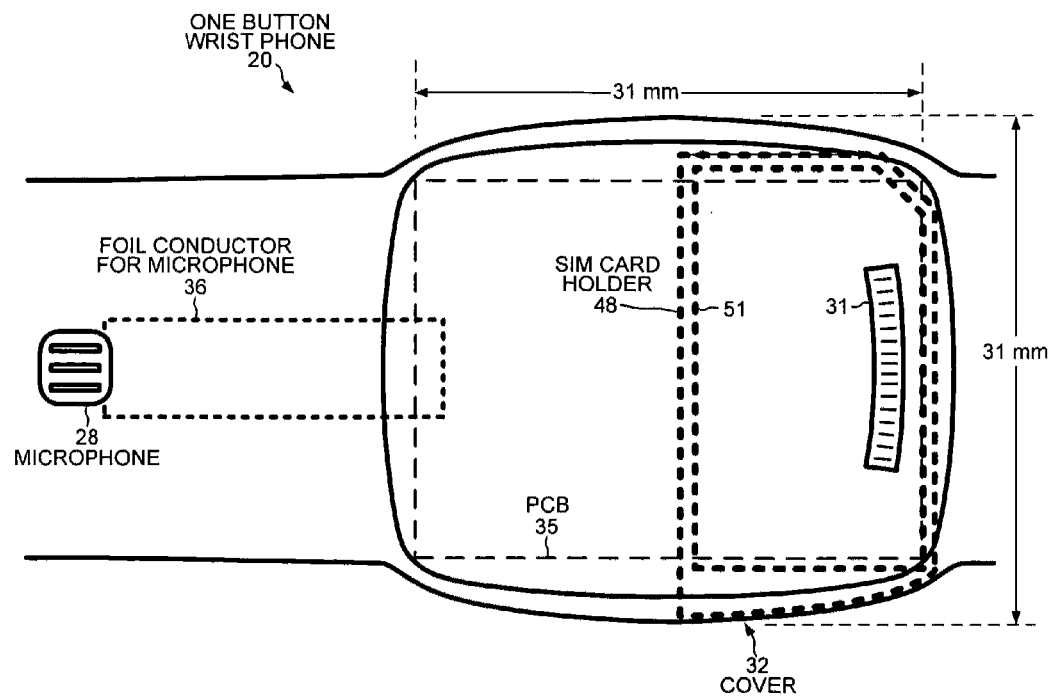
FIG. 7 is a top-down schematic diagram of the wrist phone showing the outline of a SIM card holder in relation to a printed circuit board in the component cavity.

FIG. 7 is a top-down schematic diagram of one-button wrist phone 20 showing the outline of SIM card holder 48 in relation to PCB 35. A SIM card 51 fits into a tray that slides into center portion 25 of wristband 21. One side of the tray forms cover 32 of SIM card holder 48. In one implementation, SIM card 51 is a prepaid GSM phone card that can log wrist phone 20 into a GSM network. SIM card 51 can be used in another cell phone and then transferred into wrist phone 20 for those occasions when wearing wrist phone 20 is more convenient than carrying a cell phone. For example, while jogging or working at a construction site, simply being reachable might be more important than playing with the latest downloaded cell-phone application. Wrist phone 20 rings when the number linked to SIM card 51 is dialed. And by pressing single button 49 for an extended period, the first number listed in the directory of numbers on SIM card 51 is dialed. A number can be entered as the first number using another cell phone and linking the number to the name "000".

Elderly and disabled people often have only one regular social contact for help requests. The user of wrist phone 20 can easily reach the contact person simply by pressing single button 49. Conversely, the contact person, such as a son or daughter or medical professional, can easily reach an elderly or immobile person who is wearing wrist phone 20. There is no need to get up to answer the phone or to find one's cell phone. Thus, wrist phone 20 is also attractive for parents who want to provide their children with the ability to be permanently in contact. Wrist phone 20 also allows the user to contact a service center or secretary at the single touch of a button. Telephone numbers other than the first listed number on the SIM card can be dialed by pressing single button 49 the number of times corresponding to the digit being dialed. An acoustic confirmation of the digit dialed is returned from loudspeaker 45 after any pause in the presses of the button. The acoustic confirmation can be a number of beeps or a spoken number.

In another embodiment, single button 49 is used as a five-push input cursor, i.e., the four sides of the button and the middle of the button can be pushed independently of each other for five input alternatives. Landing pads are traced onto the top of module 44 at the four compass directions and in the middle. The power of wrist phone 20 is turned on when the middle pad is pressed for a longer period of time. The power is turned off by pressing the bottom side for an extended period. An incoming call is answered when the middle pad is pressed for a short period. The call is terminated by a long press of the top pad during the call. The first number listed in the SIM card directory is dialed by pressing the middle pad for an extended period when the phone in on. Wrist phone 20 is placed in dialing mode for other numbers when the left side is pressed for an extended period.

Telephone number input to the five-push cursor requires fewer presses than does the one-push single button. For example, if the top side is pushed one time, the digit one is input. If the top side is pressed twice with only a short pause between the presses, the digit two is input. If the top side is pressed three times, the digit three is input. If the right side is pressed one time, the digit four is the input. If the right side is pressed two times with only a short time between the pushing operations, the digit five is input. If the right side is pressed three times, the digit six is input. In a similar manner, digits 7-9 are entered by pressing the bottom side. The digit zero is input by a short press of the left side.

Figure 8:
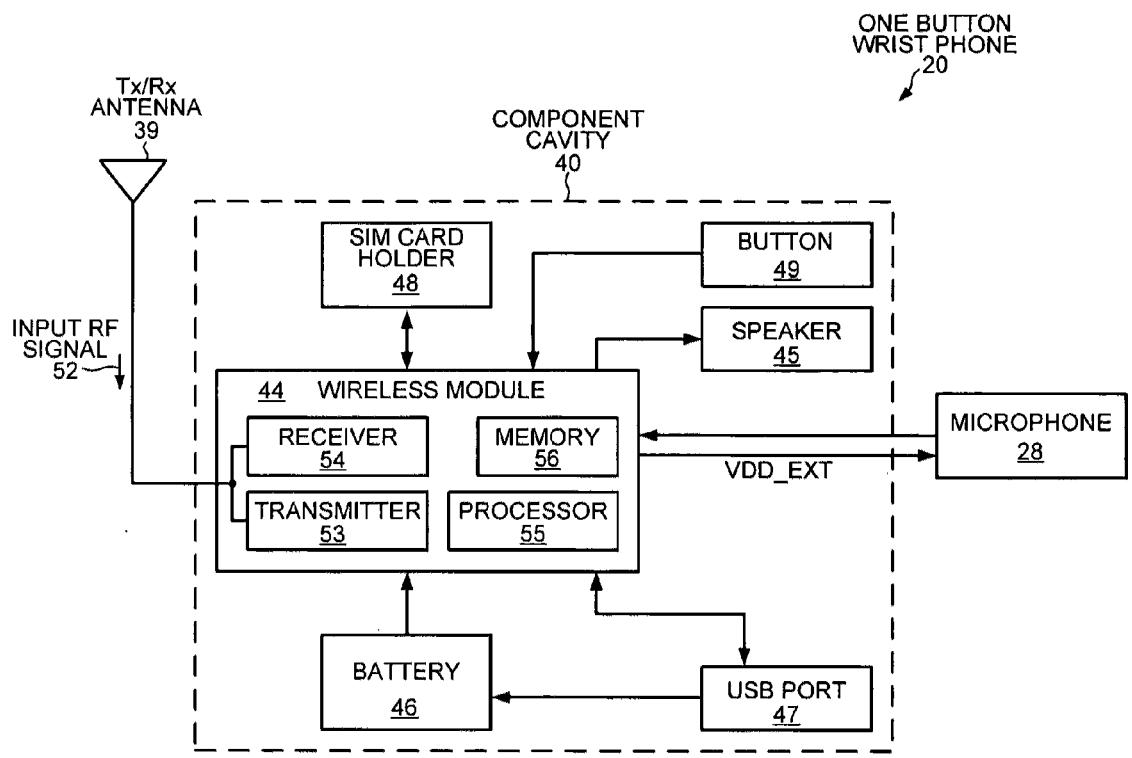
FIG. 8 is a schematic diagram of the electronic components of the wrist phone of FIG. 2.

FIG. 8 is a schematic diagram of the components of wrist phone 20. Antenna 39 transmits and receives radio frequency signals to wireless module 44. For example, an input RF signal 52 can be a voice signal or a network management signal. Antenna 39 is coupled to wireless module 44 through the antenna pad. Six-pin SIM card holder 48 receives radio network access information acquired from incoming network signals. By entering a predetermined press sequence on button 49, such as an extended single press of the left side of a five-push cursor when the phone is already in dialing mode, the user of wrist phone can send a message (such as *100#) to obtain the remaining balance of the pre-paid SIM card. The remaining balance is output from speaker 45 as a recorded voice message. Control circuitry within wireless module 44 is coupled to a transmitter 53 and to a receiver 54 for controlling the incoming and outgoing radio frequency signals, the signals coming from microphone 28, and the signals coming from button 49. Button 49 is coupled to wireless module 44 through the GPIO pin normally used as a keypad interface. Microphone 28 is coupled to wireless module 44 through the analog input channel. In addition, microphone 28 is powered by the output power supply from wireless module 44 labeled VDD_EXT. Wireless module 44 couples the RF signals, microphone signals and button signals to a processor 55 that performs signal processing operations on the signals. The control circuitry amplifies voice and tone signals that are sent to loud speaker 45. Loud speaker 45 is coupled to wireless module 44 through the analog audio interface.

One or more exemplary embodiments are implemented in software stored as instructions or code on a computer-readable medium. A memory 56 of wireless transceiver module 44 is an example of such a computer-readable medium. Memory 56 stores the instructions that are executed on processor 55 and that operate one button wrist phone 20. Processor 55 can read information from and write information to the storage medium of memory 56. By way of example, and not limitation, such computer-readable medium can comprise RAM, ROM, EEPROM or any other medium that can be used to carry or store desired program code in the form of instructions or data structures and that can be accessed by processor 55 or by an external computer through USB port 47. The mini-USB port 47 is also used to connect battery 46 to a charger or power converter. Battery 46 is coupled to wireless module 44 through the power supply interface VBAT. The user of wrist phone 20 receives an acoustic notification of a low battery condition from loudspeaker 45. USB port 47 is also used to control wrist phone 20 via an external personal computer. For example, the number that will be dialed when button 49 is pressed for an extended period can be programmed using a PC as well as by setting the first number listed in the directory of SIM card 51. USB port 47 can also be used for connecting an ear piece that outputs the voice and tone signals that would otherwise be sent to loud speaker 45.

Figure 9:
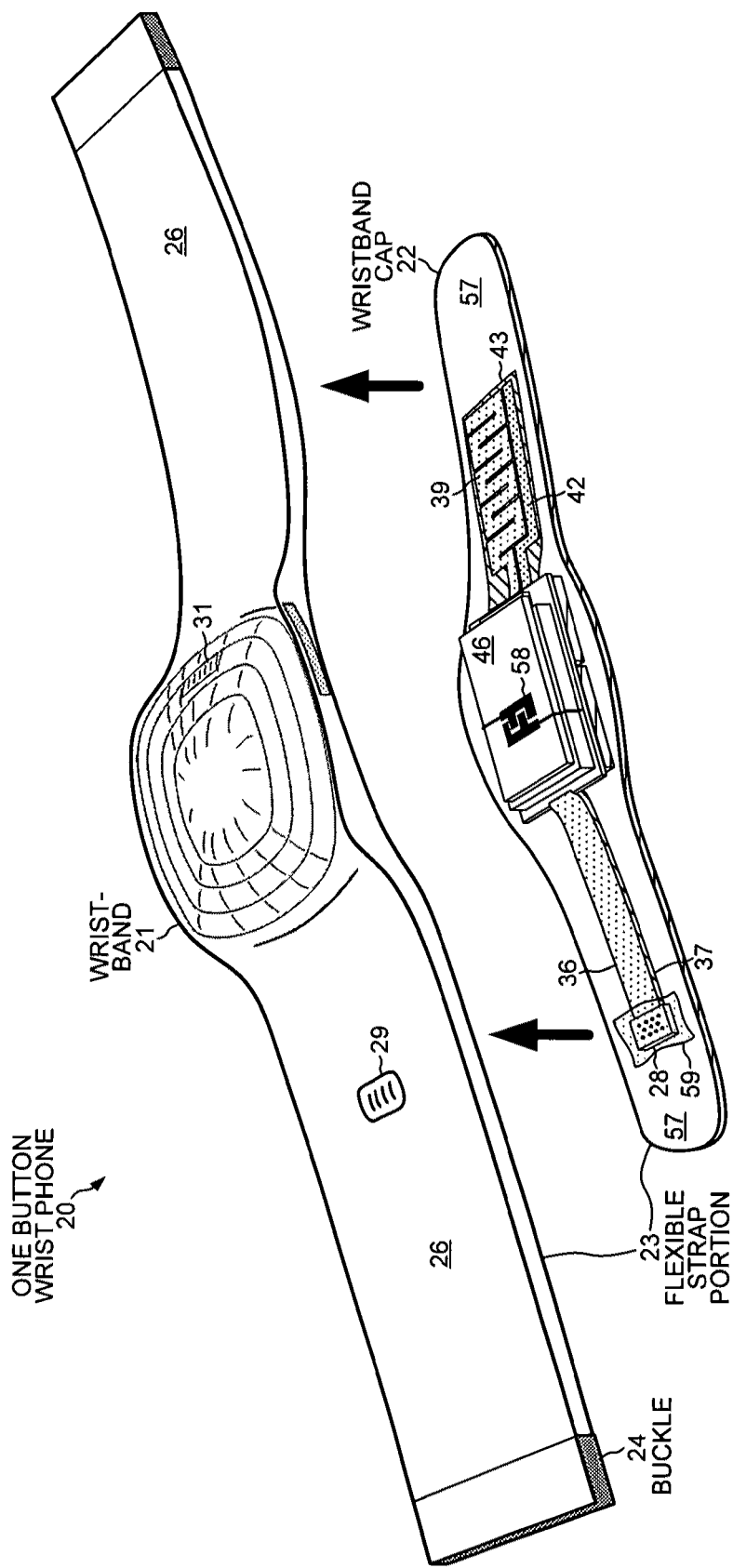
FIG. 9 is a perspective view of another embodiment of a one-button wrist phone in which the wristband cap attaches underneath the wristband.

FIG. 9 shows another embodiment of one-button wrist phone 20. In this embodiment, flexible strap portions 23 are made up of outer layer 26 on wristband 21 and a wrist-facing layer 57 on wristband cap 22. Wristband cap 22 attaches to the wrist-facing side of wristband 21 instead of to the outer face as in the embodiment of FIG. 2. Wireless module 44 and the other components mounted on PCB 35 in component cavity 40 rest on a wider center portion of wristband cap 22. Conductors 36-37 are attached to the upper and lower sides of PCB 35 and electrically couple microphone 28 to wireless module 44. Lower conductor 37 is glued to the plastic of wrist-facing layer 57. A dielectric layer 38 insulates lower conductor 37 from upper conductor 36. Shield layer 43 is also glued to the plastic of wrist-facing layer 57. Antennas 39 and 42 are attached to PCB 35 and rest on a dielectric layer 38 that insulated them from shield layer 43. FIG. 9 shows an interleaved finger landing pad 58 made by silk screening a conductive pattern on the top surface of battery 46. When the center portion of wristband 21 is depressed, the conductive coating on the inside surface of the center portion of wristband 21 makes an electrical connection between the fingers of both sides of landing pad 58.

A piece of water-impermeable fabric 59 is placed over microphone 28 and later covers the inside of opening 29 when wristband cap 22 is attached to the bottom surface of wristband 21. A second piece of water-impermeable fabric covers the inside of opening 31 to speaker 35. The edges of wristband cap 22 are attached to the bottom surface of wristband 21 using ultrasonic welding. Wrist phone 20 is water resistant and can, for example, be worn in the shower. Wrist phone 20 is appropriate for elderly people who want to be reachable at all times for safety reasons, for example if they fall in the shower. The first number of the SIM card directory that is dialed by pressing the center portion of wristband 21 can be set to an emergency telephone number, such as 911 or the number of a caregiver. Where the SIM card 51 used in wrist phone 20 is a pre-paid card, there is no recurring cost to the elderly person for maintaining the ability to call an emergency number at all times and at all times being reachable. Because wrist phone 20 is worn on the wrist and is not buried in the user's pocket, the elderly person is much more likely to hear the ring of an incoming call. Optionally, wrist phone 20 can be equipped with a vibration function to alert the user to an incoming call. The vibration on a person's wrist is more likely to be noticed than a vibrating cell phone in a person's pocket or purse.

Figure 1:
FIG. 1 (prior art) is a perspective view of a wrist phone with a small virtual keypad on a touch screen.
Figure 10:
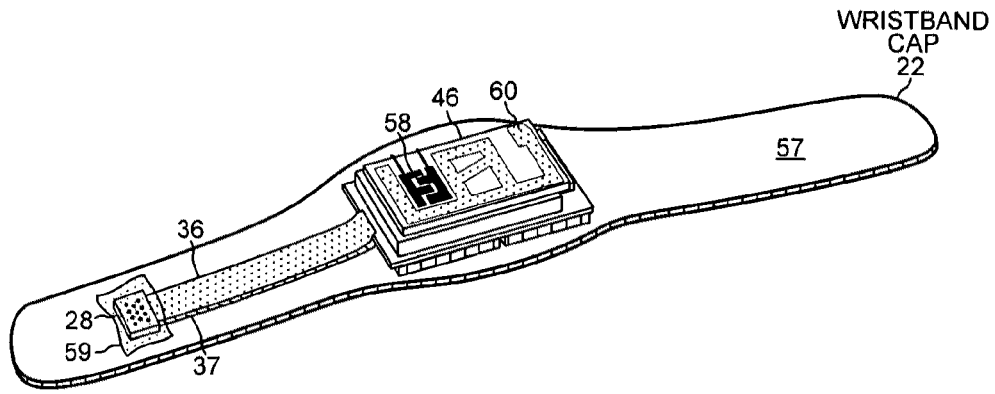
FIG. 10 shows the wristband cap of the wrist phone of FIG. 9 in which a patch antenna is attached to the upper surface of the battery so as to fit under the molded plastic button of the wristband.

FIG. 10 shows a variation of the embodiment of FIG. 9 in which flexible strap portions 23 are made up of outer layer 26 on wristband 21 and wrist-facing layer 57 on wristband cap 22. No foil antenna is attached to wrist-facing layer 57 of wristband cap 22 of FIG. 10. Instead of an antenna with a meander form along the inside surface of wrist-facing layer 57, a patch antenna 60 is stamped on top of battery 46. Patch antenna 60 can achieve good reception even though its longest dimension is shorter than a quarter wavelength of the signals that that the antenna receives. Landing pad 58 for button 49 fits in an open section of the patch form of antenna 60. Because wrist phone 20 has no display or keypad on its face, there is no conductive layer above antenna 60 that would interfere with the signal reception. The antenna of a conventional wrist phone, such as wrist phone 10 of FIG. 1, cannot be placed beneath the display 12 or under the metal casing. The reception of antenna 60 is not degraded by the molded plastic of wristband 21. Radio frequency (RF) energy emitted by antenna 60 is shielded from the user's wrist by battery 46 and module 44.

Figure 11:
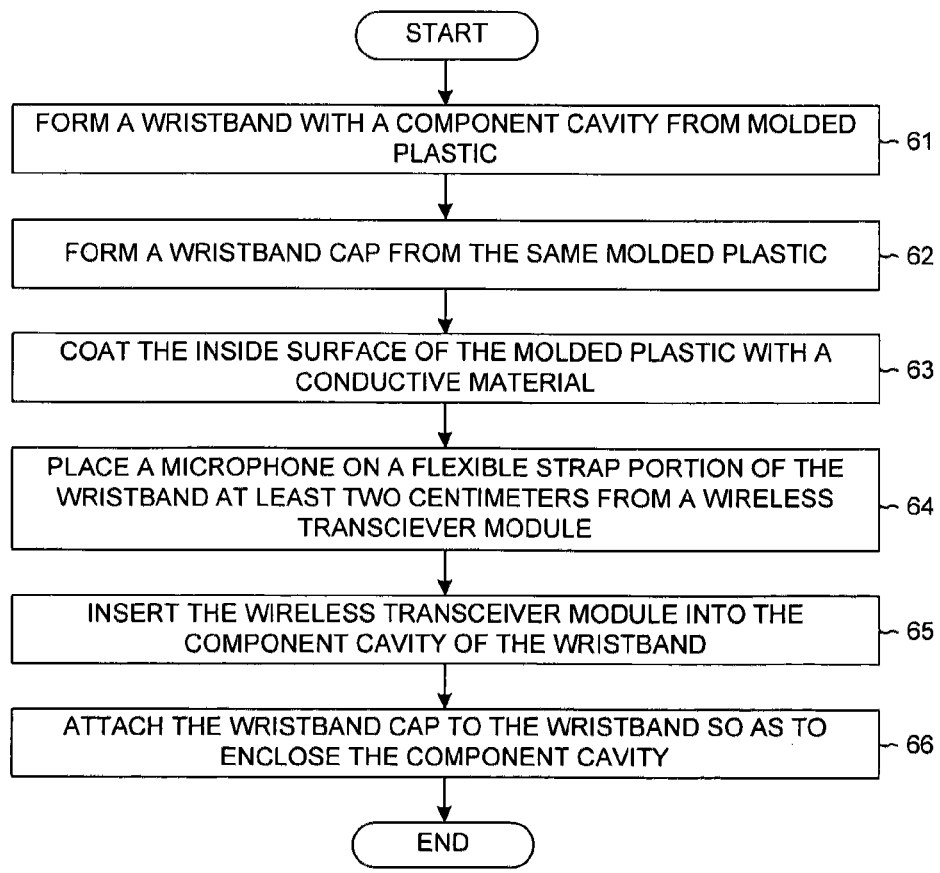
FIG. 11 is a flowchart of steps of a method of making the one-button wrist phones of FIGS. 2 and 9.

FIG. 11 is a flowchart illustrating steps 61-66 of a method of making one-button wrist phone 20. In a first step 61, wristband 21 with component cavity 40 is formed from molded plastic. In step 62, wristband cap 22 is formed from the same type of molded plastic as is wristband 21. In step 63, the inside surface of the molded plastic is coated with a layer of conductive material. In the embodiment of FIG. 2, the inner surface of wristband cap 22 is coated with the conductive material. In the embodiment of FIG. 9, the inside surface of the center portion of wristband 21 is coated with the conductive material.

In step 64, microphone 28 is placed on flexible strap portion 23 of wristband 21 at least two centimeters away from wireless transceiver module 44. In the embodiment of FIG. 2, microphone 28 is placed between outer layer 26 and wrist-facing layer 27 of wristband 21. In the embodiment of FIG. 9, microphone 28 is disposed between outer layer 26 of wristband 21 and a wrist-facing layer 57 of wristband cap 22. Microphone 28 is electrically coupled to wireless transceiver module 44 via foil conductors 36-37.

In step 65, wireless transceiver module 44 is inserted into component cavity 40. In the embodiment of FIG. 2, the components attached to PCB 35 are placed into component cavity 40 before wristband cap 22 is snapped into wristband 21. In the embodiment of FIG. 9, the antennas, conductors and components are first attached to PCB 35. Then the antennas, conductors and components are placed onto wristband cap 22. Finally, the wireless transceiver module 44 and the other components are inserted up into the component cavity in the center of wristband 21 by moving wristband cap 22 toward the bottom surface of wristband 21.

In step 66, wristband cap 22 is attached to wristband 21 so as to enclose component cavity 40. In the embodiment of FIG. 2, snapping wristband cap 22 past ridge 50 into wristband 21 forms a water-tight seal around component cavity 40. In the embodiment of FIG. 9, a water-tight seal is formed using ultrasonic welding to attach the edges of wristband cap 22 to the bottom surface of wristband 21. Alternatively, the edges of wristband cap 22 can be glued to the bottom surface of wristband 21.

Although certain specific embodiments are described above for instructional purposes, the teachings of this patent document have general applicability and are not limited to the specific embodiments described above. Although wrist phone 20 is described above as being controlled using only single button 49, wrist phone 20 can also be voice controlled. In one aspect, stored telephone numbers can be dialed using speech recognition. For example, the user can dial a stored number by saying "dial Edgar." Although wristband 21 of wrist phone 20 is described above as having a flexible strap portion 23 comprising wrist-facing layer 27 and outer layer 26 made of molded plastic, layers 26-27 can also be made of leather or fabric. For example, shield layer 43 can be glued to the inside surface of the leather of wrist-facing layer 27. Accordingly, various modifications, adaptations, and combinations of various features of the described embodiments can be practiced without departing from the scope of the invention as set forth in the claims.

What is claimed is:

1. A device comprising:
   a wristband with a first strap portion, a second strap portion and a center portion all formed from a single piece of molded plastic, wherein the center portion has a component cavity;
   a printed circuit board;
   a wireless transceiver module mounted on the printed circuit board, wherein the wireless transceiver module is disposed in the component cavity; and
   a foil antenna extending from the first strap portion into the component cavity and attaching directly to the printed circuit board, wherein the foil antenna has a flat meander pattern in the first strap portion, wherein the flat meander pattern of the foil antenna is printed onto a flexible dielectric material, and wherein the first strap portion is molded around the foil antenna on the flexible dielectric material.

2. The device of claim 1, wherein the foil antenna is attached to a strip pad on the printed circuit board.

3. The device of claim 1, wherein the wristband has an outer layer and a wrist-facing layer, and wherein the foil antenna is disposed between the outer layer and the wrist-facing layer.

4. The device of claim 1, further comprising:
   a microphone that is electrically coupled to the wireless transceiver module via a foil conductor, wherein the wristband has an outer layer and a wrist-facing layer, and wherein the foil conductor is disposed between the outer layer and the wrist-facing layer.

5. The device of claim 1, wherein there is no connector between the foil antenna and the printed circuit board.

6. The device of claim 1, wherein signals received by the wireless transceiver module from the foil antenna do not traverse any rotating hinge shaft between the wristband and the wireless transceiver module.

7. The device of claim 1, wherein the foil antenna is annealed to the first strap portion.

8. The device of claim 1, further comprising:
   a shielding layer, wherein the first strap portion has a wrist-facing layer, and wherein the shielding layer is disposed between the wrist-facing layer and the foil antenna.

9. A device comprising:
   a wristband having a first wrist-facing layer, a second wrist-facing layer and a center wrist-facing layer all formed from a single piece of molded plastic;
   a printed circuit board disposed adjacent to the center wrist-facing layer;
   a wireless transceiver module mounted on the printed circuit board; and
   a foil antenna extending from the first wrist-facing layer to the printed circuit board, wherein there is no connector between the foil antenna and the printed circuit board, wherein the foil antenna has a slight meandering path adjacent to the first wrist-facing layer, wherein the slight meandering path of the foil antenna is printed onto a flexible dielectric material, and wherein the first wrist-facing layer is molded to the flexible dielectric material on which the foil antenna is printed.

10. The device of claim 9, wherein the foil antenna is directly attached to a strip pad on the printed circuit board.

11. The device of claim 9, wherein the foil antenna is annealed to the first wrist-facing layer, and wherein the foil antenna is a flat foil band with a thickness of no more than 0.006 inches.

12. The device of claim 9, wherein the foil antenna is laminated onto a flexible dielectric material, and wherein the foil antenna has a thickness of no more than 0.0012 inches.

13. The device of claim 12, wherein the wristband is molded around the foil antenna on the flexible dielectric material.

14. The device of claim 9, wherein the foil antenna is disposed between the wrist-facing layer and an outer layer of the wristband.

15. The device of claim 9, wherein signals received by the wireless transceiver module from the foil antenna do not traverse any rotating hinge shaft between the wristband and the wireless transceiver module.

16. The device of claim 9, further comprising:
   a shielding layer disposed between the first wrist-facing layer and the foil antenna.

* * * * *